No. 693,843. Patented Feb. 25, 1902.
M. A. DEES.
COMPUTING SCALE.
(Application filed May 14, 1901.)
(No Model.) 9 Sheets—Sheet 1.
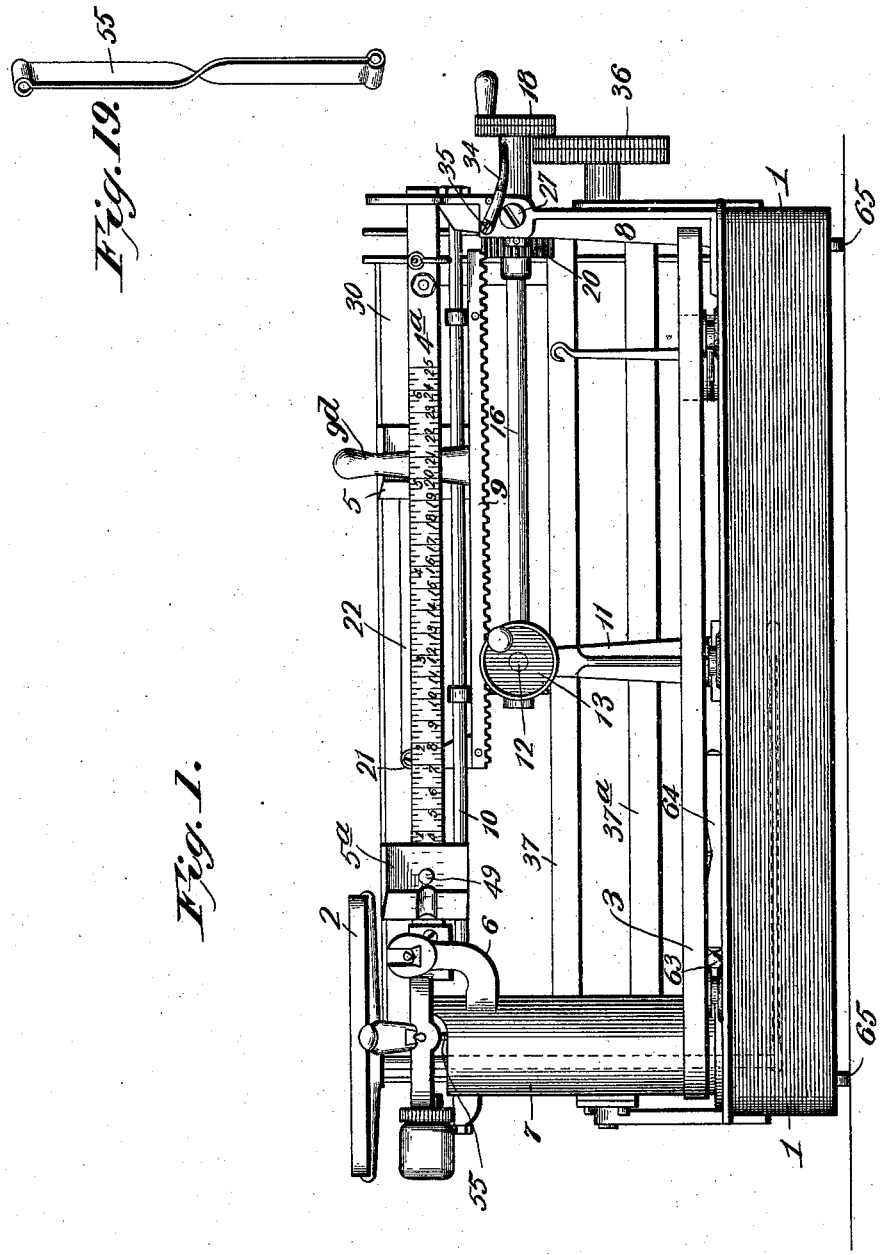
Witnesses
C. H. Walker.
E. G. Stickney
Inventor
Mark A. Dees,
by Attorneys

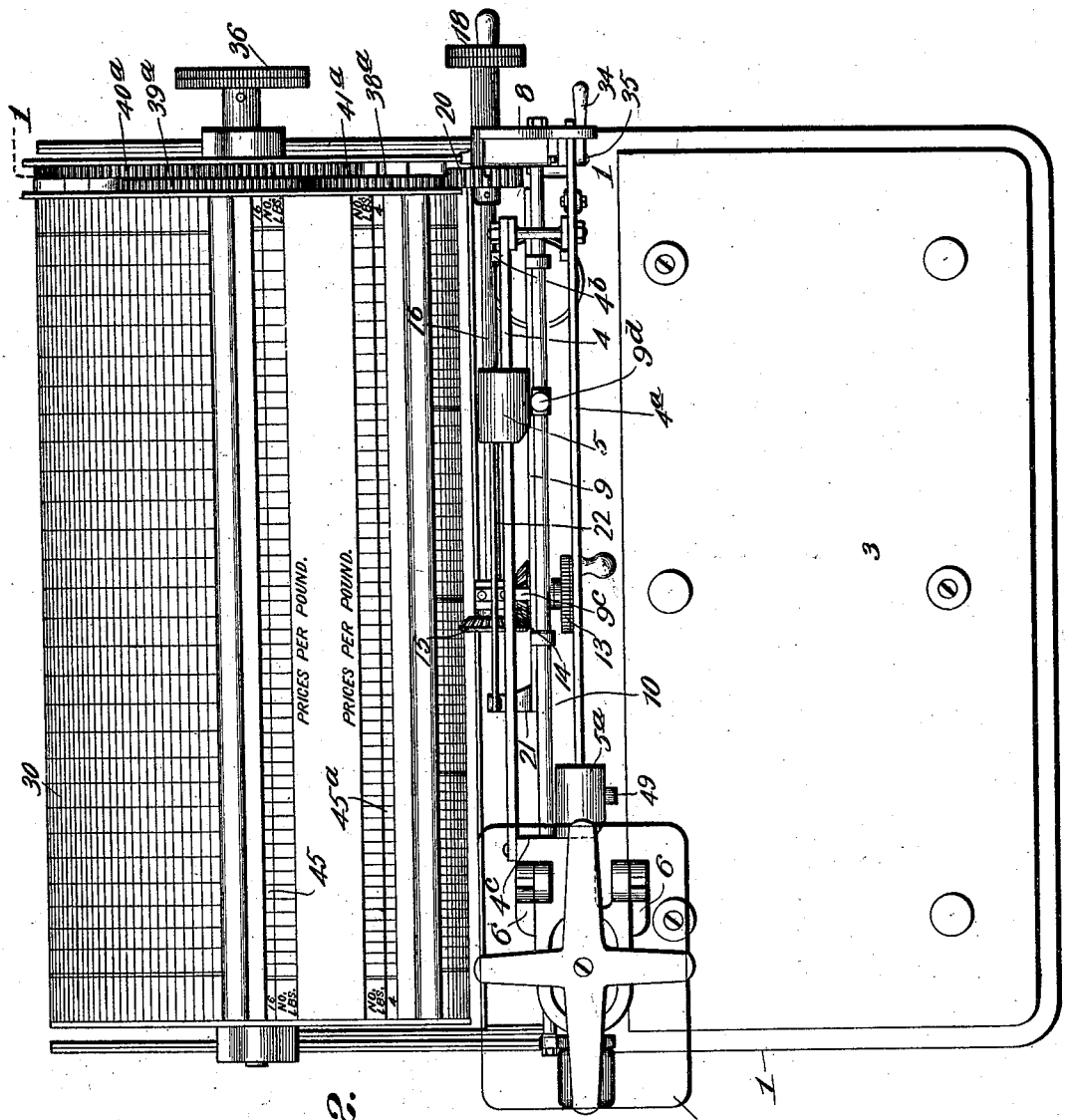

No. 693,843. Patented Feb. 25, 1902.
M. A. DEES.
COMPUTING SCALE.
(Application filed May 14, 1901.)
(No Model.) 9 Sheets—Sheet 3.
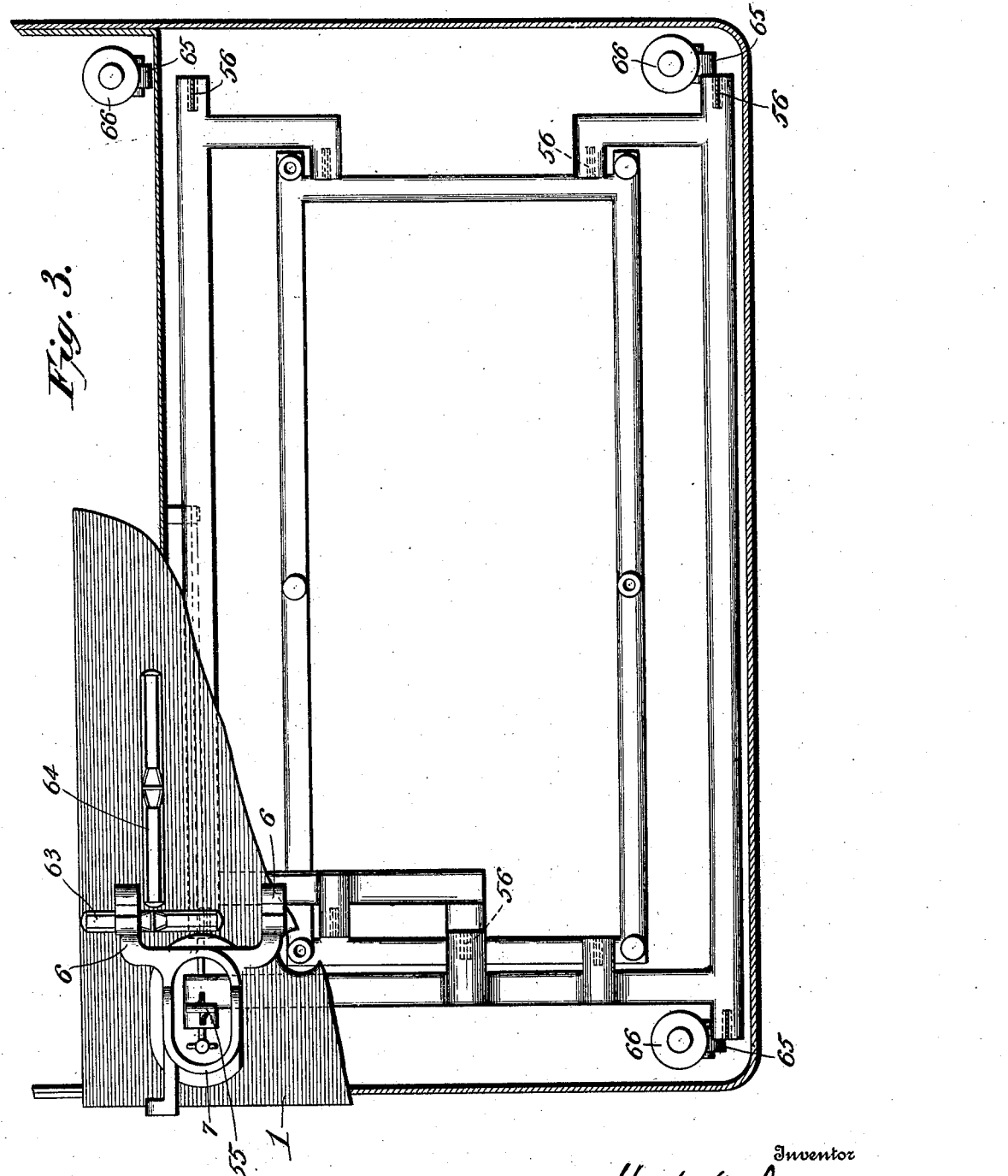

No. 693,843. Patented Feb. 25, 1902.
M. A. DEES.
COMPUTING SCALE.
(Application filed May 14, 1901.)
(No Model.) 9 Sheets—Sheet 4.
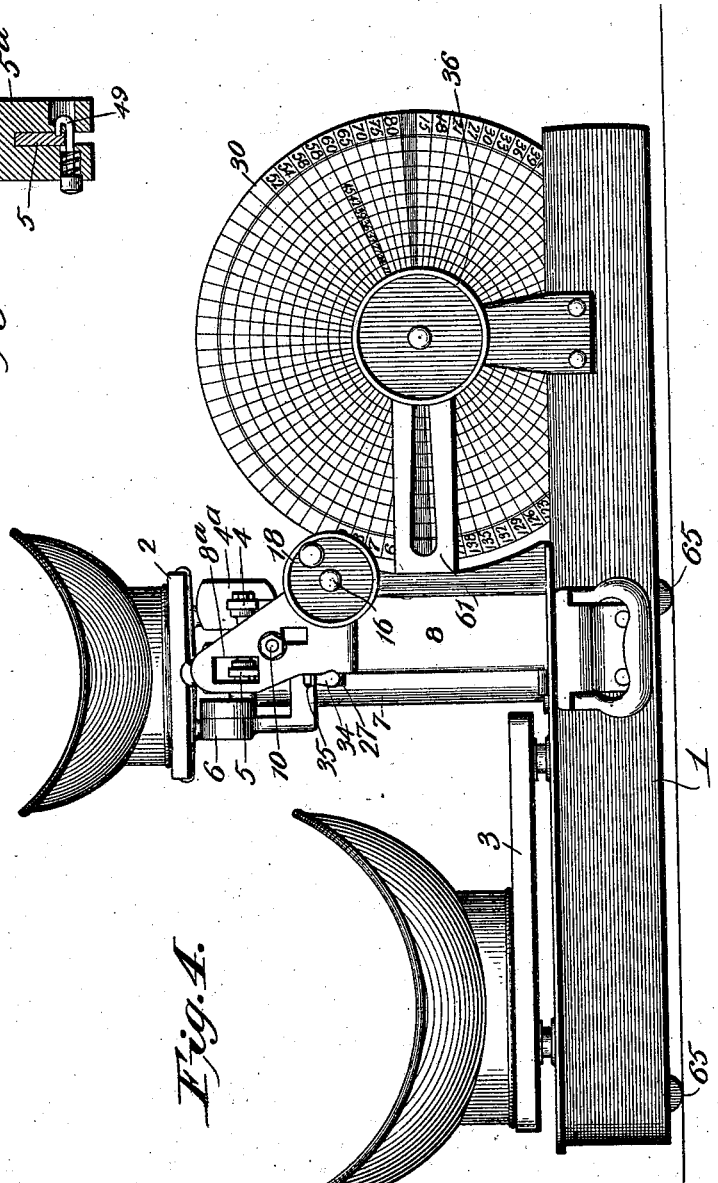
Witnesses
C. H. Walker
E. G. Stickney
Inventor
Mark A. Dees,
by G. H. W. T. H. mad
Attorneys No. 693,843. Patented Feb. 25, 1902.
M. A. DEES.
COMPUTING SCALE.
(Application filed May 14, 1901.)
(No Model.) 9 Sheets—Sheet 5.
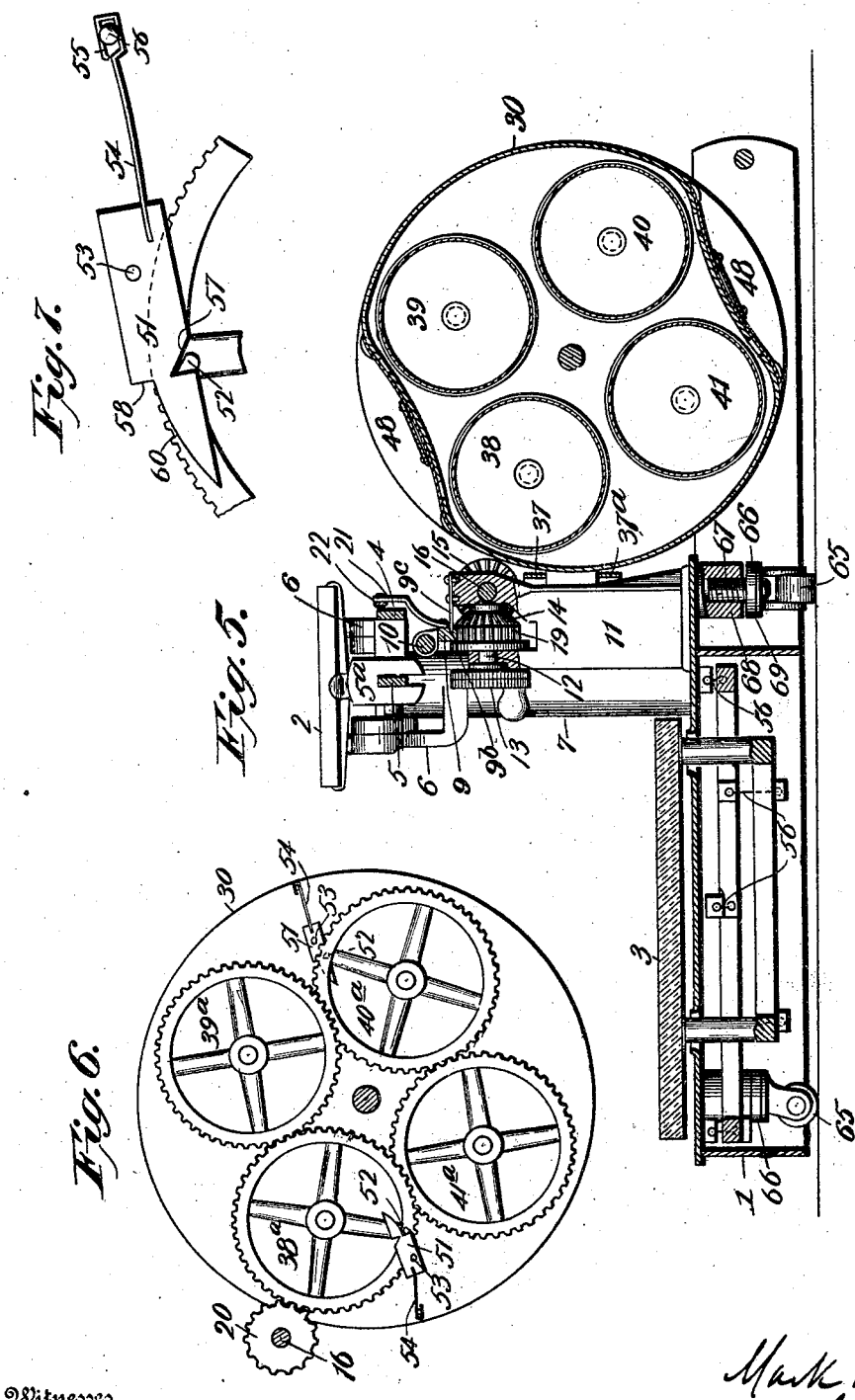

No. 693,843. Patented Feb. 25, 1902.
M. A. DEES.
COMPUTING SCALE.
(Application filed May 14, 1901.)
(No Model.) 9 Sheets—Sheet 6.
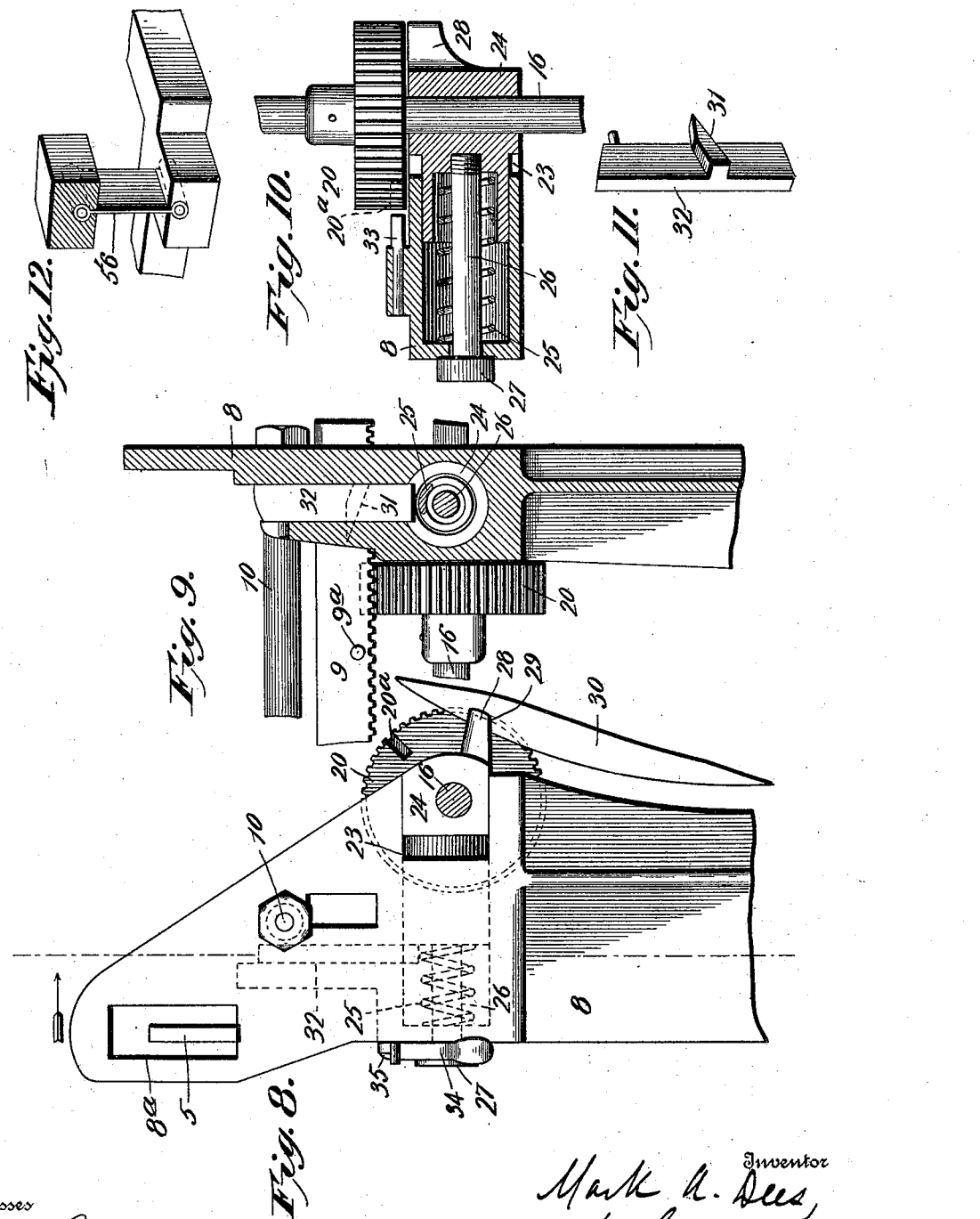

No. 693,843. Patented Feb. 25, 1902.
M. A. DEES.
COMPUTING SCALE.
(Application filed May 14, 1901.)
(No Model.) 9 Sheets—Sheet 7.

No. 693,843. Patented Feb. 25, 1902.
M. A. DEES.
COMPUTING SCALE.
(Application filed May 14, 1901.)

(No Model.) 9 Sheets—Sheet 8.

Fig. 15. Fig. 16.

Witnesses
C. H. Walker
E. G. Stickney

Inventor
Mark A. Dees,
by his Attorneys

No. 693,843. Patented Feb. 25, 1902.
M. A. DEES.
COMPUTING SCALE.
(Application filed May 14, 1901.)
(No Model.) 9 Sheets—Sheet 9.
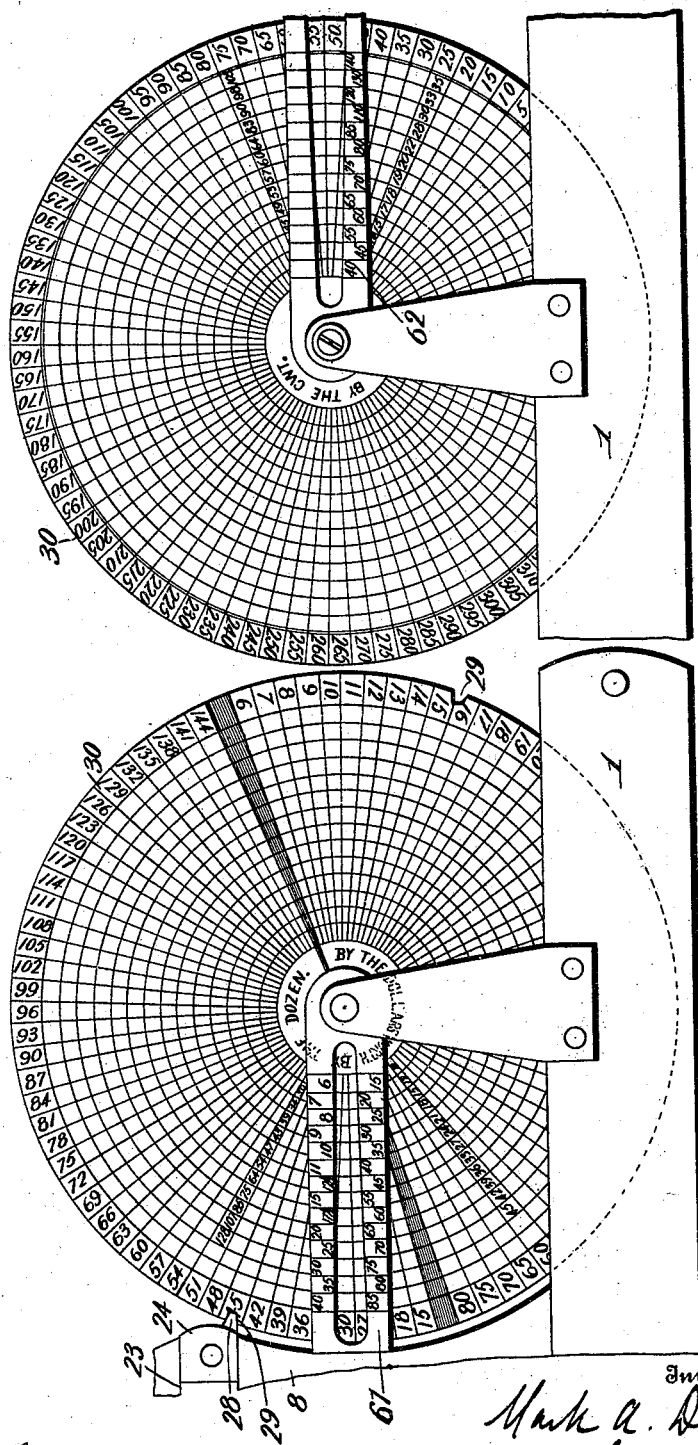

UNITED STATES PATENT OFFICE.

MARK A. DEES, OF MOSSPOINT, MISSISSIPPI.

COMPUTING-SCALE.

SPECIFICATION forming part of Letters Patent No. 693,843, dated February 25, 1902.

Application filed May 14, 1901. Serial No. 60,214. (No model.)

*To all whom it may concern:*

Be it known that I, MARK A. DEES, a citizen of the United States, residing at Mosspoint, in the county of Jackson and State of Mississippi, have invented certain new and useful Improvements in Computing-Scales; and I do hereby declare the following to be a full, clear, and exact description of the invention, which will enable others skilled in the art to which it appertains to make and use the same.

My invention relates particularly to improvements in computing-scales of the beam class which automatically indicate and compute both the weight of the merchandise and the amount to be charged therefor, and to accomplish these results I employ a device which greatly enlarges the weighing and computing capacity of scales of this type and at the same time provides a compact, simple, and economical construction.

In my application, Serial No. 34,793, filed October 29, 1900, is described an improvement in platform computing-scales of that variety in which both the weight and value of the article weighed are automatically and conveniently indicated; and my present invention, which is an improvement upon the construction described in said application, is designed to enlarge the weighing and computing functions of said machine, simplify and effect economy in the construction thereof, and generally adapt the invention to a greater field of usefulness.

My improvements are applied to any ordinary or approved form of scales of the class mentioned, and much of the mechanism incorporated herein need not necessarily be described, it being well understood by those skilled in the art of scale manufacture. It will also be seen that several features and combinations incorporated herein are included in the device described and claimed in my aforesaid application, Serial No. 34,793.

What is termed in my said former application the "large cylindrical casing" is in this instance provided with four internal computing-cylinders, which are adapted to be geared together in pairs, so that both cylinders of either pair may be revolved simultaneously. When either of said pairs of cylinders thus geared together are revolved, the other pair is locked by means of stops pertaining to that pair of cylinders. The two pairs of geared cylinders are locked as a series at all times when not connected with the poise-operating device of the computing-beam. While one pair of cylinders is always geared together, only one cylinder of the pair is intended to be used for computations at one time—that is to say, I may use a cylinder of the pair which will compute values of from one-sixteenth to six and one-fourth pounds for the upper or small platform or the other one of the pair which computes values on weights of one-fourth to twenty-five pounds for the lower or large platform. Thus while both the upper and the lower platforms are not supposed to be used at one time, the cylinders of the pair being geared together so as to rotate simultaneously, either platform may be used, the one for lighter and the other for heavier weights. Where still heavier articles are to be weighed, the other two cylinders or pair of the series are brought into position, the gear of one of them being caused to engage with the gear of the poise-operating device of the computing-beam when said last-mentioned pair of cylinders may be rotated, so that, for instance, by using one values on weights of, say, from twenty-five to fifty pounds may be weighed upon the lower platform, or by using the other cylinder computations of values may be made from, say, fifty to seventy-five pounds on the same platform. The advantage of this arrangement is that should there be an article weighing less than fifty pounds or one in excess of fifty pounds weight both cylinders will be in gear, so that either may be optionally used.

The scale-beam is, as in other scales of this description, composed of two members—that is to say, it includes the main beam and the tare-beam. Both beams are graduated in precisely the same manner, each being provided with two series of graduations, an upper and a lower one. The purpose of the lower series of graduations on each beam—viz., from zero up to twenty-five pounds—is to permit the weighing of articles up to that weight on the lower platform without the use of the ordinary counterweight, while the purpose of the upper series of graduations on each beam—viz., from zero up to six and one-fourth pounds—is to allow the weighing of articles up to that weight on the upper platform without the employment of a counterweight.

The weight designating and computing members of the upper and lower platforms are arranged in the proportion of four to one. Thus if the poise on the main beam is at five pounds upon the upper series of figures thereon a weight of twenty pounds on the lower platform would balance the poise, as will be seen, the figure "20" being immediately below the figure "5."

In the accompanying drawings, in which some of the figures are upon enlarged scale, Figure 1 is a front elevation of my invention, showing the poise of the tare-beam (the only one here visible) at zero and the poise of the main beam adjusted for a given weight. Fig. 2 is a plan of Fig. 1. Fig. 3 is a plan, mainly in section, showing details of the platform-hanging gear and the standard forming the fulcra for the two beams—viz., the main and tare beams. Fig. 4 is an end view showing the upper and lower platforms of the scale furnished with scoops, an end of the cylindrical casing containing the computing-cylinders being provided with a computing-chart adapted to be used as hereinafter specified. Fig. 5 is a vertical transverse section through the longitudinal center of the frame, lower platform, computing-cylinders, and the casing. Fig. 6 is a section on the line 1 1 of Fig. 2, showing the four computing-cylinders geared together in pairs, either pair being capable of rotation by means of the operating-gear, and also showing locking devices, hereinafter described. Fig. 7 is an enlarged view of the locking device. Figs. 8, 9, 10, 11, 12, and 13 are enlarged views of various details, hereinafter described. Fig. 14 is an enlarged view showing the cylindrical casing and portions of two of the inclosed computing-cylinders with the price-scales used in connection therewith attached to the casing, as also the gearing used with the cylinders. Figs. 15 and 16 show different parts or surfaces of the cylindrical casing with a fixed price-scale for each section of the surface. Figs. 17 and 18 are end views of the cylindrical casing, showing computing-charts used in connection with fixed price-scales. Fig. 19 is a view of a detached detail of the connection between the small platform and the hanging-gear.

Similar numerals of reference indicate similar parts in the respective figures.

1 is the ordinary base or foundation having the upper and lower platforms 2 and 3, the upper one being preferably of transparent glass, and 4 is the main beam. The poise of said beam is represented by 5 and is adapted to be mechanically adjusted from any fixed point. The main beam 4 stands in parallel relation to the ordinary tare-beam 4ª, upon which is adapted to slide the poise 5ª. Both beams, they being rigidly attached, are suitably mounted or have their fulcra in brackets 6 of the standard 7 and have appropriate unions with the platform-hanging connections. (Shown particularly in Fig. 3 and which will be hereinafter more particularly referred to.)

An important feature is the arrangement by which the poise of the tare-beam may be adjusted and held in such position as to balance either the lower or upper platform when the scoop for either is used. To provide for this, the outer or tare beam is provided with an aperture and the poise on said beam with a spring-catch, by means of which the poise can only be locked at that point, this provision preventing the danger of mistake in providing for the tare in adjusting the poise for either platform. It will be understood that the scale is complete with the lower and upper platforms without the use of scoops and that where scoops are not used the poise on the tare-beam will be pushed back or adjusted at zero and that when scoops of properly-proportioned weight—here four to one—for the respective platforms are used the poise on said beam will be moved so that its catch will lock with the beam, when, as before stated, the scale is then in condition for the use of either platform.

Fig. 13 shows the poise for the tare-beam with its spring-catch 49 adapted to be locked in an aperture of the tare-beam 4ª, whereby the latter may be adjusted and held in a position adapting it to balance either the lower or upper platform when a scoop for either is employed, the scoops being, as aforesaid, proportioned in the weights of four to one. It will be understood that the spring-catch 49 is only employed when the scoops are used, for where buckets or other tare are furnished, as by the buyer, the poise of the tare-beam will of course be adjusted correspondingly, as will be readily understood.

Upon the top of the base 1 (right-hand side of Fig. 1) is a standard 8, having a slot 8ª, Fig. 8, for limiting the movement of the outer end of the combined scale-beam, which in this instance is a continuation of the tare-beam 4ª. The standard 8 also forms the support for the guiding devices of the rack-bar 9, there being a rod 10 extending therefrom to the standard 7. In bearings of the standard 11 is mounted a short shaft 12, having a hand-wheel 13, the shaft carrying a bevel-gear 14, which engages with a similar bevel-wheel 15, mounted upon a shaft 16, having one bearing in the standard 11 and its other in the standard 8. Upon the end of the shaft 16 is a hand-wheel 18. The short shaft 12 carries a spur-wheel 19 adjacent to the bevel-wheel 15, which spur-wheel engages with the teeth of the rack-bar 9. At the opposite end of the shaft 16 is a spur-wheel 20, which is adapted to operate the internal computing-cylinders, as hereinafter explained.

From the rack-bar 9 extends upwardly a short curved arm 21, to which is pivotally secured a rod 22, having loose connection with the poise 5 of the main beam. The connection or arrangement is substantially the same as in the device described in my said former application, whereby the rotation of the shaft which operates an internal computing-cylinder will coincidently move the poise of the main beam. The rack-bar 9 is provided throughout its entire length with a slot $9^b$, which receives the outer end of a finger $9^c$, projecting from the top of the standard 11. (See Figs. 2 and 5.) The object of this provision is to keep the rack-bar from jumping or slipping a cog. In Figs. 1 and 2 is shown connected with the rack-bar 9 a handle or pull $9^d$, by means of which the rack-bar, poise, and computing-cylinders may be rapidly moved without the employment of the hand-wheel 13 or 18.

The shaft 16, which, as stated, has its bearings in the standards 11 and 8, is so arranged that the spur-wheel 20 may be engaged with and disengaged from the gearing of the internal computing-cylinders. To accomplish this, the standard 8, Figs. 1 and 8, is provided with a slot 23, in which is mounted the box-bearing 24 of the shaft 16, said box-bearing being normally projected forward by means of a spiral spring 25, surrounding a pin 26, having a head 27. The force of the spring 25 will normally keep the spur-wheel 20 engaged with the gear of one of the internal computing-cylinders when in position to be so engaged, and at such time a lip 28, integral with the box-bearing 24, will enter one of the notches 29 (of which there are two) in the end flange of the cylindrical casing 30, of which flange a fragment is shown in Fig. 8, the entrance of the lip into said notch locking the cylindrical casing against rotation.

When it is desired to disengage the spur 20 from the gearing of one of the four computing-cylinders inclosed or mounted within the casing 30, the poise 5 of the main beam is by the rotation of either hand-wheel (or by the agency of the handle or pull $9^d$) carried to the right-hand extremity of the main beam 4, the rack-bar 9 being simultaneously moved. The pin $9^a$ of said rack-bar now striking the under inclined face 31 of the latch 32, Fig. 11, said latch is raised and released from the rear of the box-bearing 24, (see Fig. 8,) so that the operator by pulling backward the hand-wheel 18 may withdraw the spur-gear 20 from the gear of an internal computing-cylinder, the outward movement of the shaft being provided for by its length and the distance between its bearings. At the same time a slot $20^a$ of the spur-wheel 20 having been brought opposite a finger 33, projecting inwardly from the standard 8, Fig. 10, said finger enters the slot, and simultaneously with such action the head 27 of the pin 26 is drawn far enough from the outer face of the standard 8 to allow a gravity-latch 34, pivoted to said standard at 35, to fall between the standard and the inner face of the pin-head, thus preventing the pin 26 and its integral box-bearing 27 from a return movement, which otherwise would be induced by the force of the spring 25. Thus the poise 5 of the main beam 4 is locked at its extreme right-hand position or when at the figure "25," and the shaft 16 not being capable of revolution, the spur 20 being locked by the finger 33, no movement of the rack-bar 9 or poise 5 can be effected. The spur-wheel 20 being now out of engagement with a gear of any computing-cylinder, the cylindrical casing 30, carrying the computing-cylinders, may be rotated by means of its hand-wheel 36 for the purpose of other computations, as will be explained hereinafter.

Four computing-cylinders 38 39 40 41 (see Fig. 5) are assembled or mounted within the cylindrical casing 30 and, as stated, geared together, Fig. 6, in pairs, so that there is always coincident rotation of two of said cylinders instead of one, as in my said former invention. Thus I here provide means for simultaneously adjusting the poise 5 of the main beam 4 and revolving two cylinders, one of which computes values on weights of, say, one-fourth to twenty-five pounds for the lower or large platform 42, while the other computes values on weights from one-sixteenth to six and one-fourth pounds on the upper or small platform 43. Either the lower platform or the upper platform may be used, and the computing-cylinder for each will, in connection with the prices per pound indicated upon the price-scales attached to the cylindrical casing 30, compute the value of a weight put upon either platform. The operator may thus quickly use either platform without any special adjustment of the cylinder therefor or transfer the article weighed from one platform to the other or use either optionally.

I further provide means whereby the pair of geared computing-cylinders not in use will be fixedly held and the pair in use automatically checked or stopped at the end of a complete revolution less a quarter of an inch, as explained below. Fig. 7 indicates, on enlarged scale, the means employed, the same means being shown on smaller scale and in action in Fig. 6. 51 represents a block pivoted within the cylindrical casing 30 at 53 and attached to a spring 54, having a sliding connection 55 with the casing by means of the pin 56. The block 51 is provided with an angular seat or depression 57, a stop-face 58, and a projecting portion having a rounded or circular surface, as indicated at 60. A spoke of one gear of each pair is furnished with a ratchet-tooth 52 of one-quarter of an inch in greatest width, which at the proper time engages the angular seat or depression 57, as shown in Fig. 7, or the stop-face, as at the right of Fig. 6. The gears $38^a$ $39^a$ are supposed to have completed a full revolution less the quarter of one inch referred to, and it will be seen that the ratchet-tooth 52 has engaged the stop-face 58 and that the spring 54 has exerted its force so as to tilt the block 51 upon its pivot 53, thus causing the rounded face 60 of said block to bear upon the tooth 52. Now supposing the gears 38 39 are to be revolved in the opposite direction, so as to bring the poise of the main beam from zero to twenty-five pounds, the tooth 52 will slide over the rounded portion 60 of the block, whereupon the block will fall or tilt upon its pivot 53, the spring 54 straightening out, and when the gear 38 has completed a full revolution less the quarter of one inch the opposite side of the tooth will engage the inclined seat or recess 57 of the block, thus checking the movement of the gearing.

In my said former application each one of the internal computing-cylinders is described as making a full revolution when the poise moves the full length of the main beam. Such arrangement does not provide a zero-value column. In my present invention the construction is such, owing to the use of the tooth 52, that each gear is stopped one-quarter of an inch short of a full revolution, it being apparent that a zero-value column is thus provided for.

When the two pairs of gears are not in use, as when the casing 30 is to be revolved upon its axis, the two sets of gears are locked, as shown in Fig. 7. The disengagement or unlocking of the cylinders when again brought into gear with the spur-wheel 20 is accomplished by exerting a little extra force in revolving either hand-wheel 15 or 18 or upon the handle or pull $9^d$, so as to throw the tooth 52 from its seat 57.

In addition to the stopping devices above described I employ at each end of the main beam 4 a stop for the poise, that at the outer end of the beam being indicated by $4^b$, while the stop at the other end is formed by a shoulder $4^c$ of the fulcrum-block of the combined beam. By the means described the cylinders and poise are simultaneously checked or stopped at the extremity of each movement, thus relieving the several parts, and especially the rod 22, from strain.

It is important that the poise on the main beam, as also the internal computing-cylinders, shall at all times be locked in the exact positions occupied by them at the moment of the separation of the spur-wheel 20 from a gear of a computing-cylinder, so that both said poise and the cylinders shall indicate the same weight. Means for effecting the locking of said poise are found in the finger 33, Fig. 10, acting in conjunction with the spur-wheel 20. Now when the cylindrical casing 30 is revolved, the lip 28 being withdrawn from the notch 29 of the flange of the casing 30, said lip will bear upon the edge of the flange, it being circular throughout, the finger 33 being thus kept in engagement with the spur-wheel 20 and locking the poise, even though the latch 34 be accidentally lifted, and no engagement of the gearing can occur until the lip 28 reaches a notch of the flange.

Fig. 14 shows the slotted cylindrical casing 30, a price-scale being mounted thereon parallel and adjacent to each slot, they being shown by 44 $44^a$. The view also shows portions of the internal computing-cylinders 38 and 39, said portions being visible through the slots 45 $45^a$ of the casing 30. The cylinder 38, which is the only one designed to be employed in connection with the upper platform 43, is here represented as exhibiting a line of figures which are computations on articles weighing four pounds and ranging from prices of one cent and a half up to eighty cents. Thus the figure "4" is found both at the right and left columns containing the figures indicating the weight of material entering into the computation and the sum three hundred and twenty immediately under the figure "80" on the fixed price-scale $44^a$, indicating that four pounds of merchandise at eighty cents a pound will amount to three dollars and twenty cents. In further illustration it will be seen that the figure "9" in the line of computing-figures is immediately under "$2\frac{1}{4}$" upon the price-scale $44^a$, indicating that four pounds of material at two and one-fourth cents a pound will cost nine cents.

The figures specifying the prices per pound and fractions thereof are arranged in two columns, the figures alternating in arrangement, the object of this being to prevent confusion of figures by placing them too closely together.

With respect to the cylinder 39 (also seen in Fig. 14) the same arrangement is carried out, except that four times the amount of material (or four times the unit of weight used in the above-explained use of cylinder 38) is here employed in illustration and that the prices on the price-scale 44 used in connection with said cylinder 39 range from one and one-half cents to forty cents. In illustration of the use of the cylinder 39 take, for example, sixteen pounds of merchandise at forty cents a pound, the cost of which will be found to be six dollars and forty cents, and take, further, the example of sixteen pounds at four and three-fourths cents, the cost of that amount of material being seventy-six cents.

The functions of the cylinders 40 and 41 are precisely the same as those described in connection with cylinder 39, the only difference being that they are intended to compute for weights from twenty-five to fifty pounds and from fifty to seventy-five pounds, respectively. The cylinder 38 is arranged to compute by sixteenths of pounds or ounces and the cylinder 39 by quarters of pounds. The cylinders 39, 40, and 41 are used exclusively in connection with the lower platform.

Figs. 15 and 16 show views of different parts or surfaces of the cylindrical casing 30, intended to be used with a fixed price-scale 37 or $37^a$ for articles of greater weight than can be computed by the internal cylinders. Fig. 15 exhibits a portion of the surface of said casing for computing values on bushels, for example, of thirty-two pounds or of sixty pounds. The cylindrical casing 30 is divided into four sections for determining the prices of bushels of thirty-two pounds, forty-six pounds, fifty-six pounds, or sixty pounds; but for convenience only such portions as relate to bushels of thirty-two pounds and sixty pounds are illustrated.

When more than seventy-five pounds are weighed, as the internal computing-cylinders will not compute above that figure, the cylindrical casing must be disconnected, as already described, and revolved so as to use it in connection with the fixed price-scale 37 or 37ª.

Referring to that section of the casing and its fixed price-scale 37 used for indicating the prices per bushel of thirty-two pounds, it will be seen, Fig. 15, that on the left-hand side of the chart there is a column of figures running from "175" to "290," which sufficiently indicates the number of pounds to be weighed, and that in horizontal arrangement to said column of figures are other rows containing numbers, one set running from "125" to "313" and the other from "157" to "391." In connection with the casing 30, as has already been stated, is employed the fixed price-scale 37 or 37ª. (Indicated in Figs. 15 and 16.) This fixed price-scale bears upon either end the words "No. lbs.," and arranged in horizontal rows are certain figures (see the left-hand section of Fig. 15) running from "15" to "60" in alternating columns, so arranged for convenience in reading. These figures ranging from "15" to "60" indicate the price per bushel of thirty-two pounds. At the right-hand section of Fig. 15 the respective figures indicated upon the fixed price-scale 37 relate to bushels of sixty pounds.

Let it be supposed that two hundred and fifty pounds of oats at twenty-five cents a bushel (of thirty-two pounds) have been weighed. The cylindrical casing 30 having been released, as above stated, is turned by the use of the hand-wheel 36 at one end thereof until "250" pounds on the marginal column is brought so as to be in line with and adjacent to the upper edge of the fixed price-scale 37. The operator will then run his eye along the upper edge of the said fixed price-scale until it reaches the figure "25," when opposite the "250" and immediately above the "25" will be found "196," indicating that the price of two hundred and fifty pounds of oats at twenty-five cents per bushel of thirty-two pounds is one dollar and ninety-six cents. The operation will be the same in the use of that section of the chart surrounding the casing 30 relating to a bushel of sixty pounds or of forty-six or fifty-six. When the casing 30 is thus employed as a computer, the internal computing-cylinders are locked, as seen in Fig. 7, either pair of said internal cylinders being only capable of rotation when brought into gear with the poise-operating mechanism.

Referring to Fig. 5, it will be seen that the cylindrical casing 30 is flattened at two sides, as indicated at 48. This arrangement brings the parts of said casing containing the slots and the price-scales parallel thereto in close proximity to the peripheries of the respective pairs of internal computing-cylinders, and the figures upon the cylinders and those upon the scales are situated practically at the top of the casing, whereby ready and convenient reading is permitted. Were the slots in the casing placed at the points where the peripheries of the internal cylinders most closely approach the cylindrical wall of the casing, the slot to be used, say, for the cylinder 38 would be about on line with the shaft 16 and that for the cylinder 39 too far in the rear to enable the operator to conveniently effect the computation. This feature of my invention is an important one, bringing the figures of the computing-cylinders and those upon the price-scales to a position the best adapted for convenient reading by both seller and buyer.

Figs. 17 and 18 show the respective ends of the cylindrical casing 30 provided with computing-charts used in connection with fixed price-scales 61 62. Fig. 17 shows the chart arranged for computing by the dozen—as, for instance, eggs, &c.—and also fractions of dollars' worth, as where a merchant sells sixty pounds of goods for a dollar and a customer should call for sixty-five cents' worth, when he would get thirty-nine pounds.

Fig. 18 shows the chart adapted to compute by the hundredweight, used also in connection with a fixed price-scale, which chart may be employed in computing the price of such articles as bran sold by the hundredweight—for instance, where a merchant is selling bran at seventy-five cents a hundredweight and a sack of bran on being weighed is found to weigh seventy-five pounds its cost being fifty-six and one-fourth cents, or, as here indicated, fifty-seven cents.

55, Fig. 19, shows the connection between the small platform and the hanging-gear of the scale mechanism, its peculiarity being that it is twisted, so as to bring the uniting-eyes at a right angle to each other. Another detail of the hanging-gear is shown in Fig. 12, the connection 56 being similar to that 55 of Fig. 19.

In Figs. 1, 3, and 5 are shown means for indicating and adjusting the level of the scales and permitting them to be readily turned or moved upon the counter. Spirit-levels, Figs. 1 and 3, are shown by 63 64 at a right angle to each other, and in Fig. 5 are shown wheels 65, mounted in adjustable casters 66, each having a threaded pin 67, which works in a nut 68, integral with or attached to the frame 1. The threaded pin 67 is provided with a hand-wheel 69, the pin and mounting of the wheel being swiveled, so that the adjustment of the level of the scales may be made by turning the hand-wheels 69.

While the scale herein indicated is only capable of weighing twenty-five pounds without counterweights, its capacity may be increased indefinitely by the addition of suitable counterweights, the mode of use of which is so well understood that it need not be described.

The operation of my invention will be fully understood from the preceding description and by those skilled in the art of scale construction as well as by users of scales of this class.

By my invention, each chart differing from all others in its prices per unit and weights and the whole system of independent charts regularly advancing from a low fraction of a pound and a low fraction of a cent per unit up to any desired weight and to the price of the most expensive goods ordinarily sold over the counter, the greatest diversity and extent of computations are possible, the mechanism enabling such results to be effected being confined in most compact and limited space.

While I have here described and shown what is considered to be a simple and efficient device and one which is an improvement upon the invention described in my aforesaid application Serial No. 34,793, I do not limit myself to the special mechanisms, constructions, and combinations herein specifically described and illustrated, it being evident that modifications thereof having the same or substantially the same functions may be devised by a skilful mechanic without exercising the faculty of invention, and such unimportant deviations from what is herein specifically described and illustrated not involving invention I consider as within the terms of my claims.

Having thus described my invention, I claim—

1. In a scale, a scale-beam, a poise on said beam, a shaft carrying a spur-wheel and a bevel-wheel, a rack adapted to constantly engage said spur-wheel, a connection between the rack and the poise, and a second shaft carrying a bevel-gear and a spur-wheel, the former engaging the bevel-wheel of said first shaft, combined with a rotary computing mechanism independent of the scale-beam and having gearing adapted to engage the spur-wheel of said second shaft, substantially as set forth.

2. In a scale, a scale-beam, a poise on said beam, a shaft carrying a spur-wheel and a bevel-wheel, a rack adapted to constantly engage said spur-wheel, a connection between the rack and the poise, a second shaft carrying a bevel-gear and a spur-wheel, the former engaging the bevel-wheel of said first shaft, and means for rotating said two shafts combined with a rotary computing mechanism independent of the scale-beam and having gearing adapted to engage the spur-wheel of said second shaft, substantially as set forth.

3. In a scale, a scale-beam, a poise on said beam, a shaft carrying a spur-wheel and a bevel-wheel, a rack adapted to constantly engage said spur-wheel, a connection between the rack and the poise, a second shaft carrying a bevel-gear and a spur-wheel, the former engaging the bevel-wheel of said first shaft, and means for rotating said shafts, combined with a rotary computing mechanism consisting of computing-cylinders geared in pairs and rotatable as a series, a gear of either pair being adapted to engage the spur-wheel of said second shaft, substantially as set forth.

4. In a scale, a combined scale-beam consisting of a main and a tare beam, a poise on each of said beams, that on the tare-beam being provided with a catch for engaging or locking with the tare-beam at a specified point, a shaft carrying a spur-wheel and a bevel-wheel, a rack adapted to constantly engage said spur-wheel, a connection between the rack and the poise on the main beam, and a second shaft carrying a bevel-gear and a spur-gear, the former engaging the bevel-wheel of said first shaft, combined with a rotary computing mechanism independent of the scale-beam and having gearing adapted to engage the spur-wheel of said second shaft, substantially as set forth.

5. In a computing-scale, the combination of a frame, a standard thereon, a combined scale-beam, having its fulcra on said standard, consisting of a main and a tare beam, a poise on each of said beams, that on the tare-beam being provided with a lock for engaging and locking at a specified point with the tare-beam, a rotary computing mechanism independent of the scale-beam, and means whereby the poise on the main beam may be slid or moved upon the main beam and the computing mechanism rotated simultaneously, substantially as set forth.

6. In a computing-scale, the combination of a main beam, a poise thereon, a pair of intergeared rotary computing-cylinders independent of the main beam, price-scales used with said cylinders, and means whereby the poise on the main beam and the pair of computing-cylinders may be coincidently operated, substantially as set forth.

7. In a computing-scale, the combination of weighing members, including a main beam and a poise thereon, a rotatable casing, two pairs of rotatable computing-cylinders carried within said casing, each pair of said cylinders being geared together so as to revolve coincidently, and means whereby the poise of said main beam may be slid upon its beam and a connected pair of said computing-cylinders simultaneously revolved, substantially as set forth.

8. In a computing-scale, the combination of weighing members including a main beam, a tare-beam and a poise for each, the poise on the tare-beam being provided with a lock for engaging and locking at a specified point with said beam, a rotatable casing, two pairs of rotatable computing-cylinders carried within said casing, each pair of said cylinders being geared together so as to be revolved coincidently, and means whereby the poise of said main beam may be slid upon its beam and a connected pair of computing-cylinders simultaneously revolved, substantially as set forth.

9. In a computing-scale, the combination of weighing members including a main beam and a poise thereon, a slotted rotatable casing, a price-scale parallel and adjacent to each slot, two pairs of rotatable computing-cylinders carried within said casing, each pair of said cylinders being geared together so as to revolve coincidently, and means whereby the poise of said main beam may be slid upon its beam and a connected pair of said computing-cylinders simultaneously revolved, substantially as set forth.

10. In a computing-scale, the combination of weighing members including a combined main beam and tare-beam, a poise on each of said beams, the poise on the tare-beam being provided with a lock for engaging and locking at a specified point with the tare-beam, a rotatable casing, two pairs of computing-cylinders carried within said casing, each pair of said cylinders being geared together so as to revolve coincidently, means whereby the poise of said main beam may be slid upon its beam and a connected pair of said computing-cylinders simultaneously revolved, and means for locking and preventing the rotation of one pair of said internal computing-cylinders when the other pair thereof is in engagement with the poise-moving devices, substantially as set forth.

11. In a computing-scale having an upper and a lower weighing-platform and weighing members including a main beam and a poise thereon, the combination of a pair of rotatable computing-cylinders, one for use with the lower platform and the other with the upper platform, a price-scale adapted for use with each cylinder, and means whereby the poise on the main beam and the pair of computing-cylinders may be simultaneously moved, substantially as set forth.

12. In a computing-scale having an upper and a lower weighing-platform and weighing members including a combined main beam and a tare-beam, a poise on each beam, the combination of a pair of rotatable computing-cylinders, one for use with the lower platform and the other with the upper platform, a price-scale adapted for use with each cylinder, and means whereby the poise on the main beam and a pair of computing-cylinders may be simultaneously moved, substantially as set forth.

13. In a computing-scale, a scale-beam, a poise on said beam, a shaft carrying a spur-wheel and a bevel-wheel, a rack adapted to constantly engage said spur-wheel, a connection between the rack and the poise, a second shaft carrying a bevel-gear and a spur-wheel, the former engaging the bevel-wheel of said first shaft, and means for rotating said shafts, combined with a rotary computing mechanism independent of the scale-beam and comprising a pair of intergeared computing-cylinders adapted to engage the spur-wheel of said second shaft, substantially as set forth.

14. In a scale, a combined scale-beam consisting of a main and a tare beam, a poise on each of said beams, a shaft carrying a spur-wheel and a bevel-wheel, a rack adapted to constantly engage said spur-wheel, a connection between the rack and the poise of the main beam, a second shaft carrying a bevel-gear and a spur-wheel, the former engaging the bevel-wheel of said first shaft, and means for rotating said shafts, combined with a rotary computing mechanism independent of the scale-beam and comprising a pair of intergeared computing-cylinders adapted to engage the spur-wheel of said second shaft, substantially as set forth.

15. In a computing-scale, the combination of weighing members including a main beam and a poise thereon, a rotatable casing, intergeared computing-cylinders carried within said rotatable casing, means whereby the poise may be slid upon its beam and said intergeared computing-cylinders simultaneously revolved, and means for locking and preventing the rotation of said intergeared computing-cylinders when not in engagement with the poise-moving devices, substantially as set forth.

16. In a computing-scale having an upper and a lower weighing-platform and weighing members including a main beam and a poise thereon, the combination of a pair of rotatable computing-cylinders, one for use with the lower platform and the other with the upper platform, each of said cylinders being divided by vertical and horizontal intersecting lines, the squares or spaces thus formed at an end of each cylinder being occupied by figures indicating weights, and each having opposite thereto a horizontal row of figures indicative of products multiplied by price, a scale having figures thereon indicating prices in columns parallel to the columns of figures on the cylinder showing the product of weight and price, and means whereby the poise on the main beam and the pair of computing-cylinders may be simultaneously moved, substantially as set forth.

17. In a computing-scale, the combination of weighing members including a main beam and a poise thereon, a rotatable slotted casing having a flattened side, a price-scale parallel and adjacent to each of said slots, said price-scales being situated at the flattened portion of said casing, rotatable computing-cylinders carried within said casing, a pair of said cylinders being geared together so as to revolve coincidently, and means whereby the poise of said main beam may be slid upon its beam and a pair of computing-cylinders simultaneously revolved, substantially as set forth.

18. In a computing-scale, the combination of weighing members including a main beam and a tare-beam, a poise on each of said beams, that on the tare-beam being provided with a lock for engaging and locking at a specified point with the tare-beam, a rotatable cylindrical casing having flattened sides and two slots at each of said flattened sides, and a price-scale parallel and adjacent to each of said slots, two pairs of rotatable computing-cylinders carried within said rotatable cylindrical casing, each pair of said cylinders being geared together so as to revolve coincidently, and means whereby the poise of said main beam may be slid upon its beam and a connected pair of said computing-cylinders simultaneously revolved, portions of the peripheries of said computing-cylinders so revolved being adjacent to the slots in said casing, substantially as set forth.

19. In a computing-scale, the combination of weighing members including a combined main beam and a tare-beam, a poise on each of said beams, that on the tare-beam being provided with a lock for engaging and locking at a specified point with the tare-beam, a slotted rotatable casing, a price-scale parallel and adjacent to each slot of said casing, two pairs of rotatable computing-cylinders carried within said casing, each pair of said cylinders being geared together so as to revolve coincidently, means whereby the poise of said main beam may be slid upon its beam, and a connected pair of said computing-cylinders simultaneously revolved, means whereby said two pairs of internal cylinders may be locked when not in engagement with the poise-moving mechanism, and means whereby the rotatable casing may be locked during the joint movement of the poise of the main beam and a pair of internal computing-cylinders, substantially as set forth.

20. In a computing-scale, the combination of weighing members, a rotatable cylindrical casing serving in connection with a fixed price-scale as a computer, said cylindrical casing carrying intergeared computing-cylinders, and exposing the gearing of said cylinders, means for rotating said intergeared computing-cylinders, and means whereby said casing may be locked with and unlocked from said means for rotating said internal computing-cylinders, substantially as set forth.

21. In a computing-scale, a rotatable cylindrical casing 30 having a flange provided with notches and carrying mounted therein intergeared computing-cylinders, said casing further exposing gearing of said internal cylinders, combined with a shaft 16, the outer box-bearing 24 of said shaft having a lip 28, the spur 20 on said shaft, and means whereby said spur 20 may be drawn from and held out of engagement with gearing of said internal cylinders and the lip 28 simultaneously drawn and held from engagement with the notch of a flange of said cylindrical casing, whereby said casing may be rotated upon its axis, substantially as set forth.

22. In a scale, the combination, with weighing members, of a cylindrical casing having peripheral and end charts; a series of computing-cylinders each mounted upon a separate axis within said casing and provided with a peripheral chart, said casing being slotted; a price-scale carried by said casing and arranged parallel with and adjacent to each of said slots; a fixed price-scale arranged parallel with the axis of said casing and adjacent to its peripheral chart; a fixed price-scale arranged parallel to the chart at each end of said casing; means for rotating the casing so as to enable computations to be made by bringing figures upon its peripheral or end charts into proximity with figures upon the respective price-scales; and means for rotating said internal computing-cylinders in order to bring figures on their peripheries into proximity with figures on the respective price-scales carried by said casing, so that computations indicated by said internal cylinders may be visible through the slots of said casing, substantially as set forth.

23. In a computing-scale, the combination of a beam, a poise, a slotted rotatable casing, rotatable computing-cylinders carried within said casing, the latter being flattened at places on its periphery between two of said rotatable cylinders, and means for operatively connecting said rotatable cylinders with the poise, substantially as set forth.

In testimony whereof I hereunto set my hand and seal.

MARK A. DEES. [L. S.]

Witnesses:
GEORGE H. HOWARD,
C. B. BULL.